US011589492B2

(12) United States Patent
Thoreson et al.

(10) Patent No.: US 11,589,492 B2
(45) Date of Patent: Feb. 28, 2023

(54) STABILIZER FOR A REAR HITCH

(71) Applicant: DEERE & COMPANY, Moline, IL (US)

(72) Inventors: Curtis P. Thoreson, Janesville, IA (US); David King, Cedar Falls, IA (US); Clayton P. Neumann, Cedar Falls, IA (US); Zach Kooistra, Waterloo, IA (US)

(73) Assignee: Deere & Company, Moline, IL (US)

( * ) Notice: Subject to any disclaimer, the term of this patent is extended or adjusted under 35 U.S.C. 154(b) by 421 days.

(21) Appl. No.: 16/804,871

(22) Filed: Feb. 28, 2020

(65) Prior Publication Data
US 2021/0267111 A1    Sep. 2, 2021

(51) Int. Cl.
*A01B 59/04* (2006.01)
*A01B 59/041* (2006.01)

(52) U.S. Cl.
CPC .................. *A01B 59/041* (2013.01)

(58) Field of Classification Search
CPC ... A01B 59/068; A01B 59/067; A01B 59/042; A01B 59/066; A01B 59/041
See application file for complete search history.

(56) References Cited

U.S. PATENT DOCUMENTS 3,056,458 A * 10/1962 Gray ..................... A01B 59/067
 172/485
3,310,123 A * 3/1967 Abbott ................. A01B 59/041
 172/450
3,503,625 A * 3/1970 Fendt ..................... A01B 59/00
 172/450
4,236,724 A * 12/1980 Schillings ............ A01B 59/041
 172/450
4,862,971 A * 9/1989 Azzarello ............ A01B 59/041
 172/450
4,865,134 A * 9/1989 Rugen .................. A01B 59/041
 172/450

(Continued)

FOREIGN PATENT DOCUMENTS

DE         19983501 T5     8/2001
DE         10122955 A1    12/2001

OTHER PUBLICATIONS

German Search Report issued in application No. DE102021200663. 9, dated Oct. 27, 2021, 6 pages.

*Primary Examiner* — Jamie L McGowan
(74) *Attorney, Agent, or Firm* — Michael Best & Friedrich LLP

(57) ABSTRACT

A hitch that connects to a chassis of the work vehicle and rotates with respect to the chassis includes a first bracket connected to a first portion of the chassis, a first stabilizer bar connected to the first bracket, and a first hitch arm connected to the first stabilizer bar. The first hitch arm has a free end that engages a work implement. A second bracket is connected to a second portion of the chassis. The second portion of the chassis is spaced from the first portion of the chassis, so that the second bracket is spaced apart from and independent of the first bracket. A second stabilizer bar is connected to the second bracket. A second hitch arm is connected to the first stabilizer bar. The second hitch has a free end configured to selectively engage the work implement.

20 Claims, 6 Drawing Sheets

(56) References Cited

U.S. PATENT DOCUMENTS

| | | | | |
|---|---|---|---|---|
| 5,462,303 A * | 10/1995 | Langen | ................ | A01B 59/041 |
| | | | | 172/450 |
| 6,056,069 A * | 5/2000 | Hagen | .................. | A01B 59/004 |
| | | | | 403/44 |
| 6,089,328 A * | 7/2000 | Moore | ............... | A01B 59/0415 |
| | | | | 172/447 |
| 6,203,047 B1 * | 3/2001 | Adamek | ............ | A01B 59/0415 |
| | | | | 172/450 |
| 6,234,508 B1 * | 5/2001 | Tuttle | ................... | A01B 59/004 |
| | | | | 280/446.1 |
| 6,352,124 B1 * | 3/2002 | Sancho | ............... | A01B 59/002 |
| | | | | 172/447 |
| 6,609,575 B1 * | 8/2003 | Crabb | ................... | B60D 1/141 |
| | | | | 280/491.2 |
| 6,769,496 B2 * | 8/2004 | Casali | ................. | A01B 59/041 |
| | | | | 172/439 |
| 2003/0159842 A1 * | 8/2003 | Casali | ................. | A01B 59/041 |
| | | | | 172/450 |
| 2015/0122517 A1 * | 5/2015 | Schauerhofer | ..... | A01B 59/0415 |
| | | | | 172/450 |

* cited by examiner

STABILIZER FOR A REAR HITCH

BACKGROUND

The present disclosure relates to work vehicles having a rear hitch and stabilizer configurations for rear hitches.

SUMMARY

In one embodiment, the disclosure provides a work vehicle having a ground-engaging implement, a chassis supported on the ground-engaging implement, a prime mover that moves the chassis along a ground surface, and a hitch connected to the chassis that rotates with respect to the chassis. The hitch has a first bracket connected to a first portion of the chassis, a first stabilizer bar connected to the first bracket, and a first hitch arm connected to the first stabilizer bar. The first hitch arm engages a work implement. A second bracket is connected to a second portion of the chassis spaced from the first portion of the chassis, so that the second bracket is spaced apart from and independent of the first bracket. A second stabilizer bar is connected to the second bracket, and a second hitch arm is connected to the first stabilizer bar. The second hitch has a free end that engages the work implement. A controller is in electrical communication with the first stabilizer bar, with the second stabilizer bar, and with the work implement. A user interface is engaged by a user and in electrical communication with the controller.

In another embodiment the disclosure provides a hitch for a work vehicle that connects to a chassis of the work vehicle and rotates with respect to the chassis. The hitch includes a first bracket connected to a first portion of the chassis, a first stabilizer bar connected to the first bracket, and a first hitch arm connected to the first stabilizer bar. The first hitch arm has a free end that engages a work implement. A second bracket is connected to a second portion of the chassis. The second portion of the chassis is spaced from the first portion of the chassis, so that the second bracket is spaced apart from and independent of the first bracket. A second stabilizer bar is connected to the second bracket. A second hitch arm is connected to the first stabilizer bar. The second hitch has a free end configured to selectively engage the work implement.

In another embodiment, the disclosure provides a work vehicle including a ground-engaging implement and a chassis supported on the ground-engaging implement. The chassis includes a first side portion and a second side portion, opposite the first side portion. A prime mover moves the chassis along a ground surface on the ground-engaging implement, and a hitch is connected to the chassis and can rotate with respect to the chassis. The hitch has a first bracket including a first end portion and a second end portion spaced from the first end portion. The first end portion is connected to the first side portion of the chassis. A first stabilizer bar is connected to the second end portion of the first bracket. A first hitch arm is connected to the first stabilizer bar, and has a free end that engage a work implement and moves with respect to the first bracket by the first hitch arm. A second bracket includes a first end portion and a second end portion spaced from the first end portion. The first end portion is connected to the second side portion of the chassis. The second portion of the chassis is spaced from the first portion of the chassis, so that the first end portion of the first bracket is spaced from the first end portion of the second bracket, and the second end portion of the second bracket is spaced from the second end portion of the second bracket. The first bracket is connected to the second bracket only indirectly through the chassis. A second stabilizer bar is connected to the second end portion of the second bracket, and a second hitch arm is connected to the first stabilizer bar. The second hitch has a free end that engages the work implement. The second hitch arm moves with respect to the second bracket by the second hitch arm. A plurality of fasteners each extend through a portion of the chassis and through a portion of the first bracket to connect the first bracket to the chassis. The chassis includes one of a first mating recess and a first mating protrusion and the first bracket includes the other of the first mating recess and the first mating protrusion. The first mating recess receives the first mating protrusion while the first bracket is connected to the chassis. The chassis includes one of a second mating recess and a second mating protrusion and the second bracket includes the other of the second mating recess and the second mating protrusion. The second mating recess receives the second mating protrusion while the second bracket is connected to the chassis.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Figure 1:
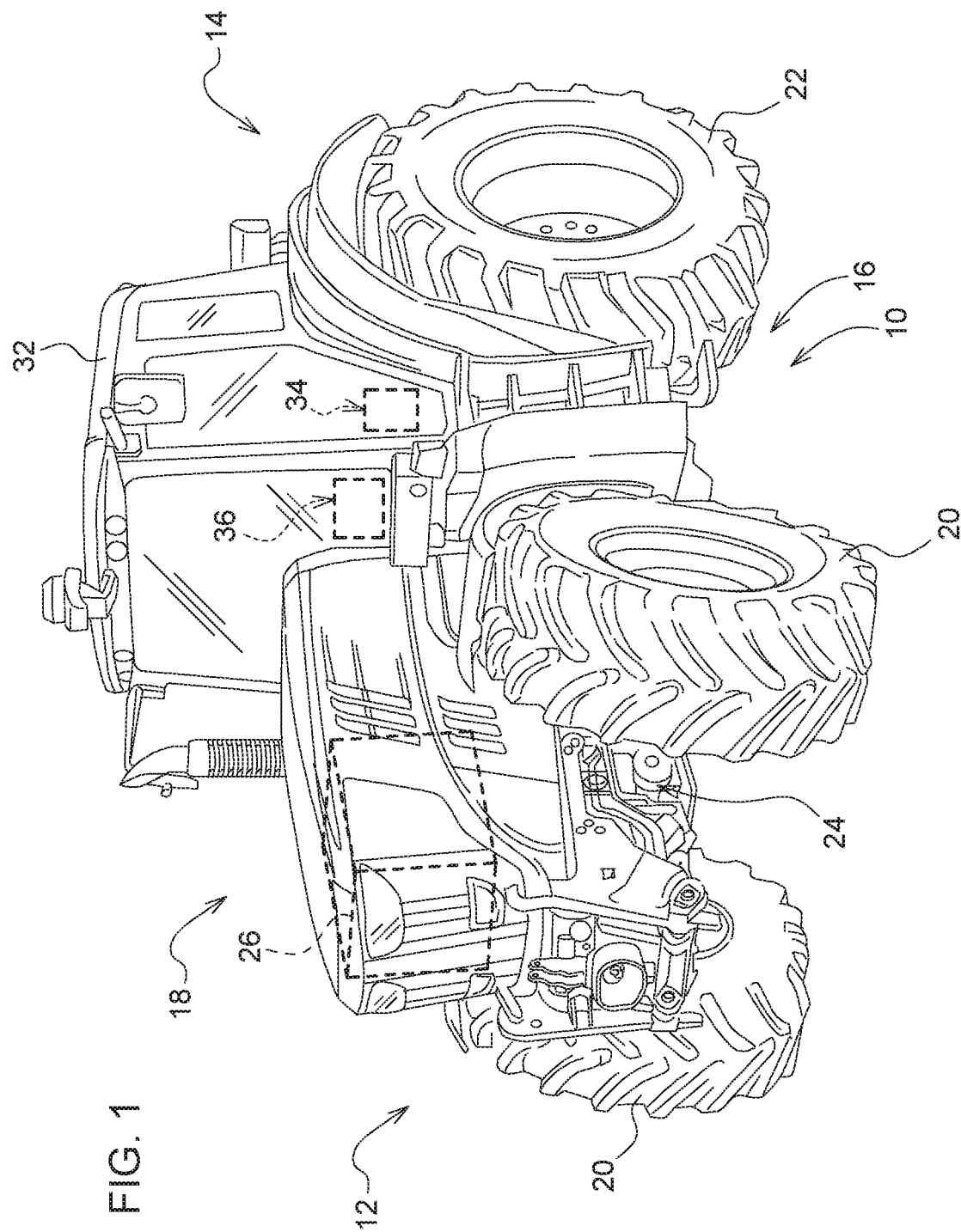
FIG. 1 is a perspective view of a work vehicle according to some embodiments.

FIG. 1 illustrates a work vehicle 10 including a front portion 12, a rear portion 14, a first side portion 16, a second side portion 18, front wheels 20, rear wheels 22, a chassis 24, a prime mover 26, a cab 32, a controller 34, and a user interface 36. The front wheels 20 are connected to the chassis 24 proximate the front portion 12 of the work vehicle 10. One of the front wheels 20 is positioned on the first side portion 16 and the other one of the front wheels 20 is positioned on the second side portion 18 of the work vehicle 10. The rear wheels 22 are connected to the chassis 24 proximate the rear portion 14 of the work vehicle 10. One of the rear wheels 22 is positioned on the first side portion 16 and the other one of the rear wheels 22 is positioned on the second side portion 18 of the work vehicle 10. While front wheels 20 and rear wheels 22 are illustrated, other ground-engaging implements, such as tracks, can be utilized.

The prime mover 26 is connected to the chassis 24 proximate the front portion 12 of the work vehicle. The prime mover 26 is configured to provide power to the front wheels 20 and/or the rear wheels 22 to thereby move the work vehicle 10 over a ground surface.

The cab 32 is connected to the chassis 24 proximate the rear portion 14 of the work vehicle 10. The controller 34 can be positioned in or near the cab 32. The controller 34 is electrically connected to the front wheels 20, the rear wheels 22 and the prime mover 26 to send and receive signals from the front wheels 20, the rear wheels 22 and the prime mover 26.

The user interface 36 is positioned in the cab 32 such that a user in the cab 32 can engage the user interface 36. The user interface 36 is electrically connected to the controller 34 to send signals to and receive signals from the controller 34.

Figure 2:
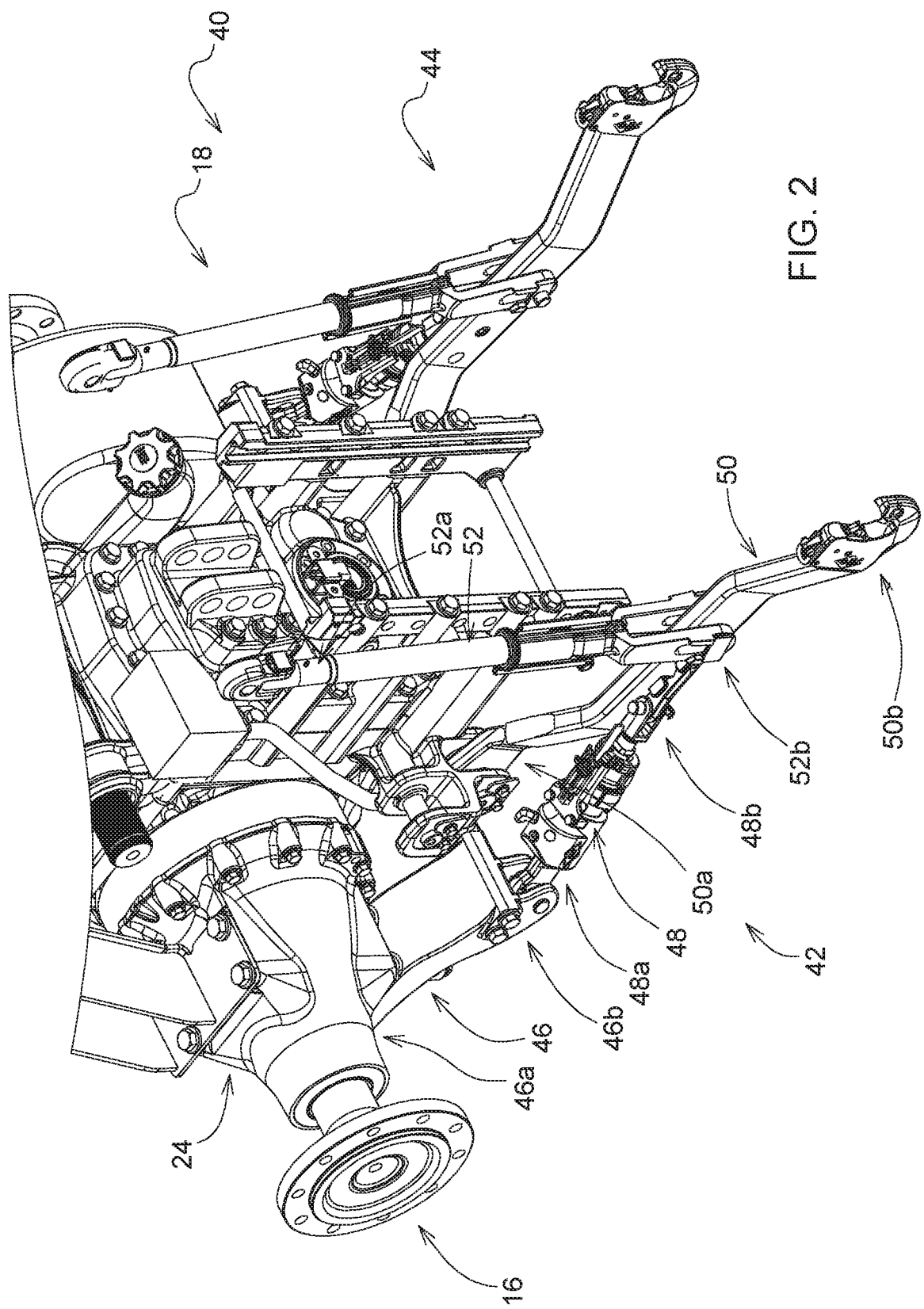
FIG. 2 is first side perspective view of a portion of the work vehicle of FIG. 1.

FIG. 2 illustrates a hitch assembly 40 for use with the work vehicle 10. The illustrated hitch assembly 40 is connected to the rear portion 14 of the work vehicle 10. In other embodiments, the hitch assembly 40 can be connected to the front portion 12 of the work vehicle 10.

The hitch assembly 40 includes a first side 42 and a second side 44 opposite the first side 42. The first side 42 is substantially a mirror-image of the second side 44 in the illustrated embodiment. The first side 42 is shown most clearly in FIG. 2 and the second side 44 is shown most clearly in FIG. 3. The first side 42 is positioned on the first side portion 16 of the work vehicle 10 and the second side 44 is positioned on the second side portion 18 of the work vehicle 10.

The first side 42 includes a first bracket 46, a first stabilizer bar 48, a first hitch arm 50 and a first lift arm 52. The first bracket 46 has a first portion 46a connected to the first side portion 16 of the chassis 24 and a second portion 46b spaced from the first portion 46a. The first bracket 46 is inhibited from rotating or translating with respect to the chassis 24.

The first stabilizer bar 48 includes a first portion 48a connected to the second portion 46b of the first bracket 46 and a second portion 48b spaced from the first portion 48a. The first stabilizer bar 48 is configured to rotate with respect to the chassis 24.

The first hitch arm 50 includes a first portion 50a connected to the chassis 24 and a second portion 50b spaced from the first portion 50a. The first hitch arm 50 is configured to rotate with respect to the chassis 24. The second portion 50b is configured to engage a work implement (e.g., a snow plow, planting equipment, tillage equipment, etc.).

The first lift arm 52 includes a first portion 52a connected to the chassis 24 and a second portion 52b spaced from the first portion 52a and connected to the first hitch arm 50. The first lift arm 52 is an actuator that extends and retracts, thereby having a variable length. The first lift arm 52 is configured to rotate the first stabilizer bar 48, the first hitch arm 50 with respect to the chassis 24 upon extending and retracting the first lift arm 52.

Figure 3:
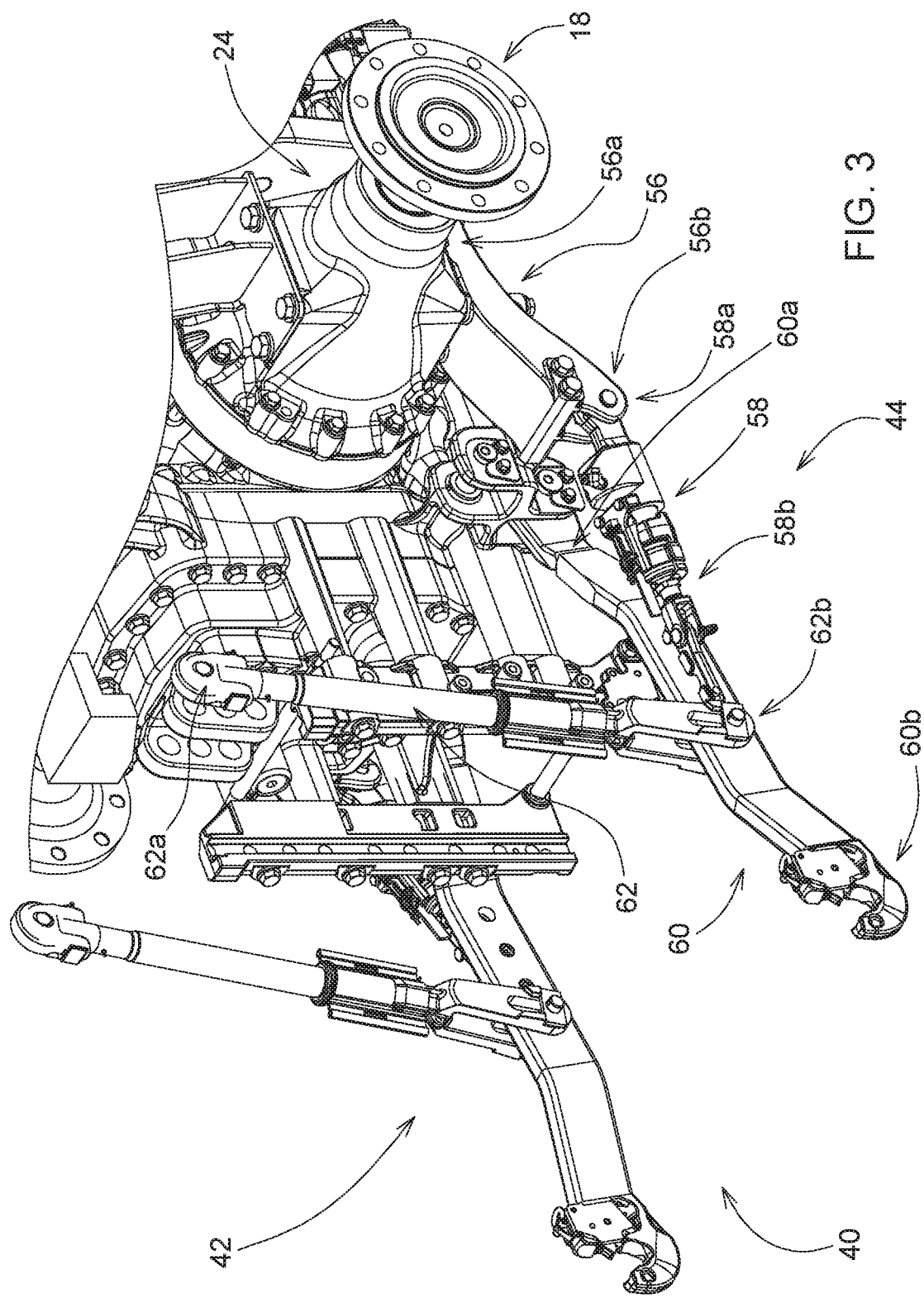
FIG. 3 is a second side perspective view of the portion of the work vehicle shown in of FIG. 2.

FIG. 3 shows the second side 44 of the hitch assembly 40 in greater detail. The second side 44 includes a second bracket 56, a second stabilizer bar 58, a second hitch arm 60 and a second lift arm 62. The second bracket 56 has a first portion 56a connected to the second side portion 18 of the chassis 24 and a second portion 56b spaced from the first portion 56a. The second bracket 56 is inhibited from rotating or translating with respect to the chassis 24.

The second stabilizer bar 58 includes a first portion 58a connected to the second portion 56b of the second bracket 56 and a second portion 58b spaced from the first portion 58a. The second stabilizer bar 58 is configured to rotate with respect to the chassis 24.

The second hitch arm 60 includes a first portion 60a connected to the chassis 24 and a second portion 60b spaced from the first portion 60a. The second hitch arm 60 is configured to rotate with respect to the chassis 24. The second portion 60b is configured to engage a work implement (e.g., a snow plow, planting equipment, tillage equipment, etc.).

The second lift arm 62 includes a first portion 62a connected to the chassis 24 and a second portion 62b spaced from the first portion 62a and connected to the second hitch arm 60. The second lift arm 62 is an actuator that extends and retracts, thereby having a variable length. The second lift arm 62 is configured to rotate the second stabilizer bar 58, the second hitch arm 60 with respect to the chassis 24 upon extending and retracting the second lift arm 62.

Figure 4:
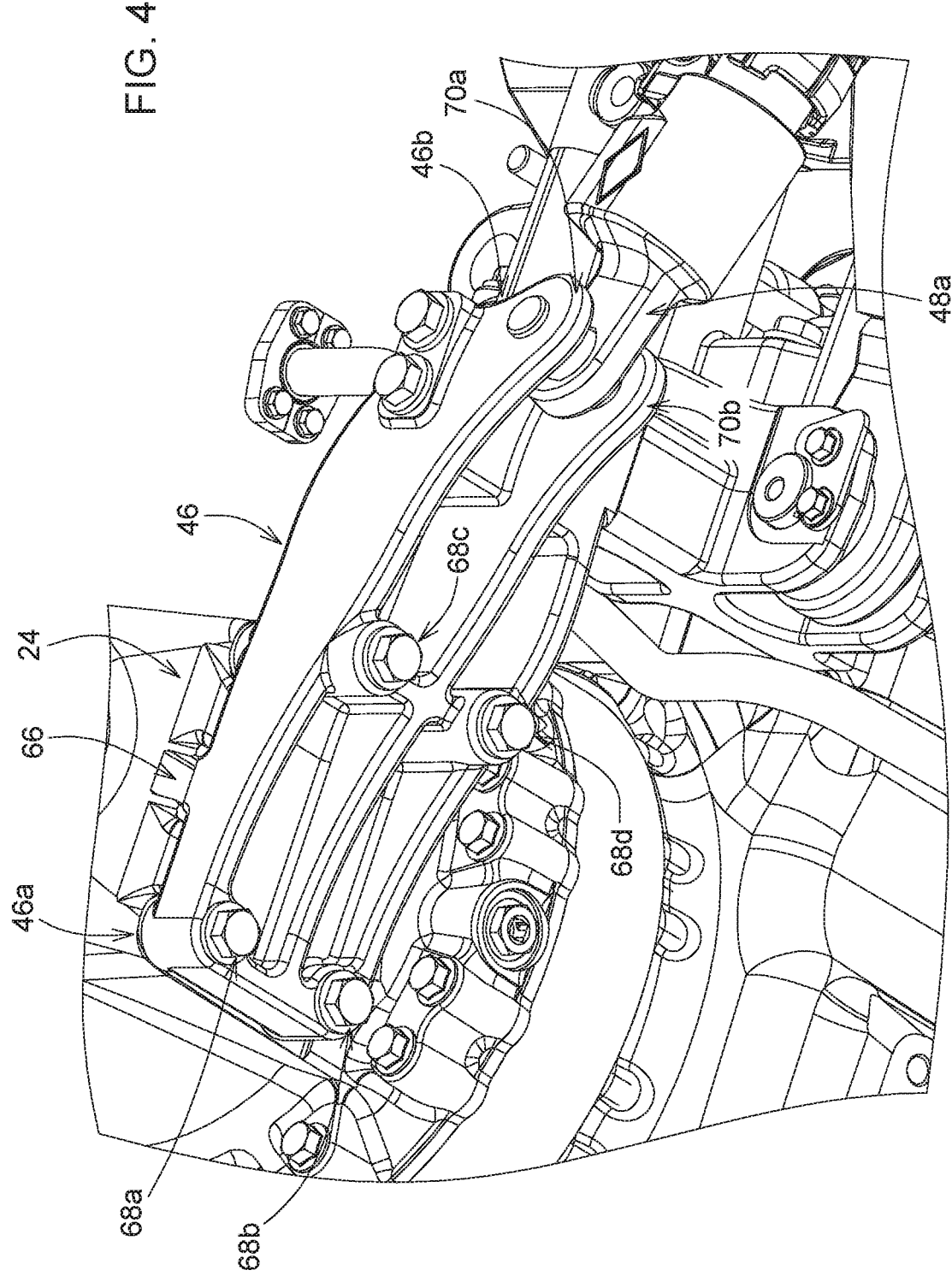
FIG. 4 is a close up bottom perspective view of the portion of the work vehicle shown in FIG. 2.

FIG. 4 shows the connection between the first bracket 46 and the chassis 24 in greater detail. The chassis 24 defines four apertures and a first slot 66. The four apertures are each sized to receive a respective fastener 68a, 68b, 68c, 68d. The illustrated fasteners 68a, 68b, 68c, 68d are bolts, but other suitable fasteners can be used in other embodiments. The second portion 46b of the first bracket 46 includes first and second downwardly depending flanges 70a, 70b configured to receive the first portion 48a of the first stabilizer bar 48 between the downwardly depending flanges 70a, 70b. The first stabilizer bar 48 is configured to rotate with respect to the first bracket 46 about the downwardly depending flanges 70a, 70b. While the illustrated embodiments includes a yoke connection between the first stabilizer bar 48 and the first bracket 46, the first stabilizer bar 48 can be connected to the first bracket 46 in other configurations in some embodiments.

Figure 5:
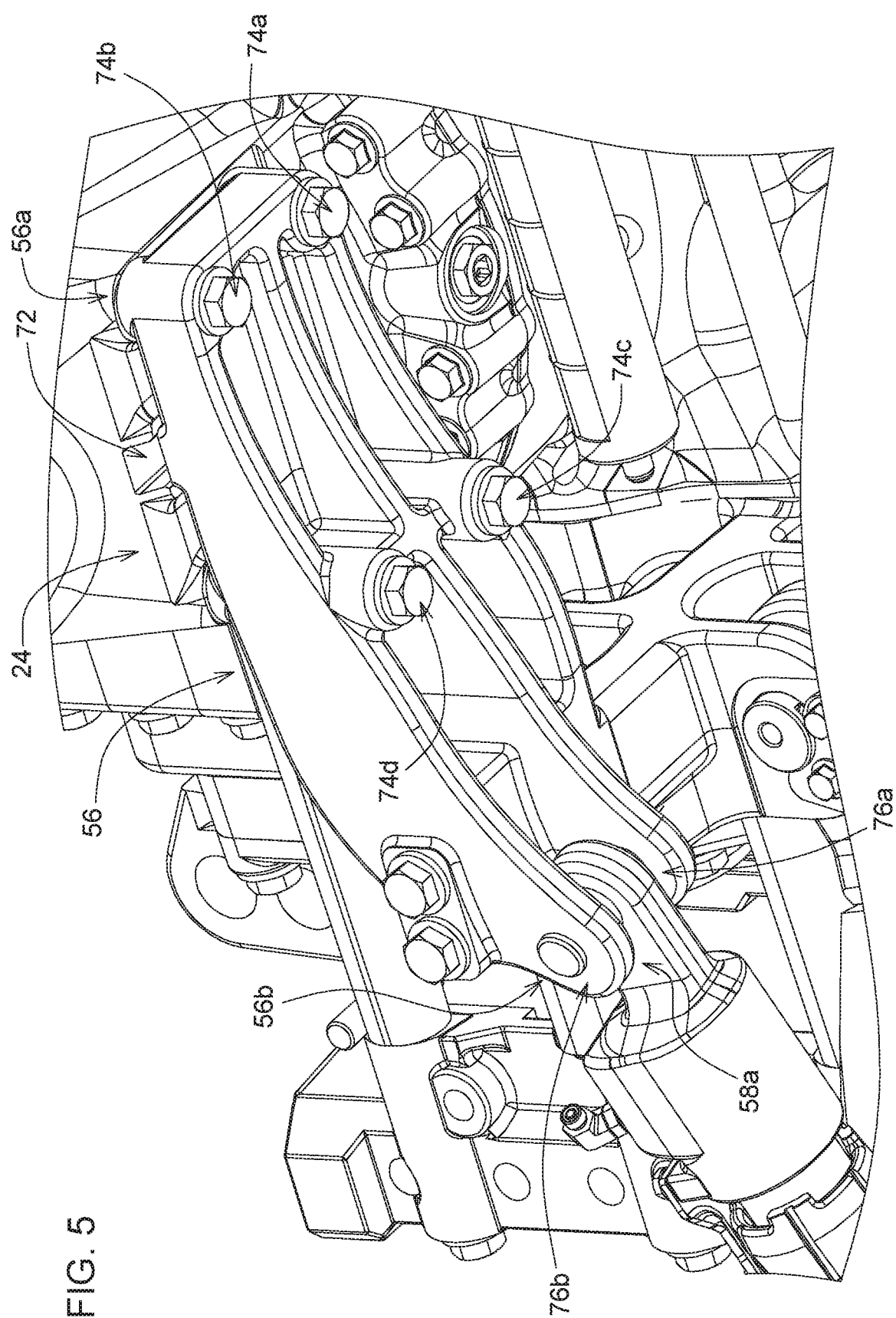
FIG. 5 is a close up bottom perspective view of the portion of the work vehicle shown in FIG. 3.

FIG. 5 shows the connection between the second bracket 56 and the chassis 24 in greater detail. The chassis 24 defines four apertures and a second slot 72. The four apertures are each sized to receive a respective fastener 74a, 74b, 74c, 74d. The illustrated fasteners 74a, 74b, 74c, 74d are bolts, but other suitable fasteners can be used in other embodiments. The second portion 56b of the second bracket 56 includes first and second downwardly depending flanges 76a, 76b configured to receive the first portion 58a of the second stabilizer bar 58 between the downwardly depending flanges 76a, 76b. The second stabilizer bar 58 is configured to rotate with respect to the second bracket 56 about the downwardly depending flanges 76a, 76b. While the illustrated embodiments includes a yoke connection between the second stabilizer bar 58 and the second bracket 56, the second stabilizer bar 58 can be connected to the second bracket 56 in other configurations in some embodiments.

Figure 6:
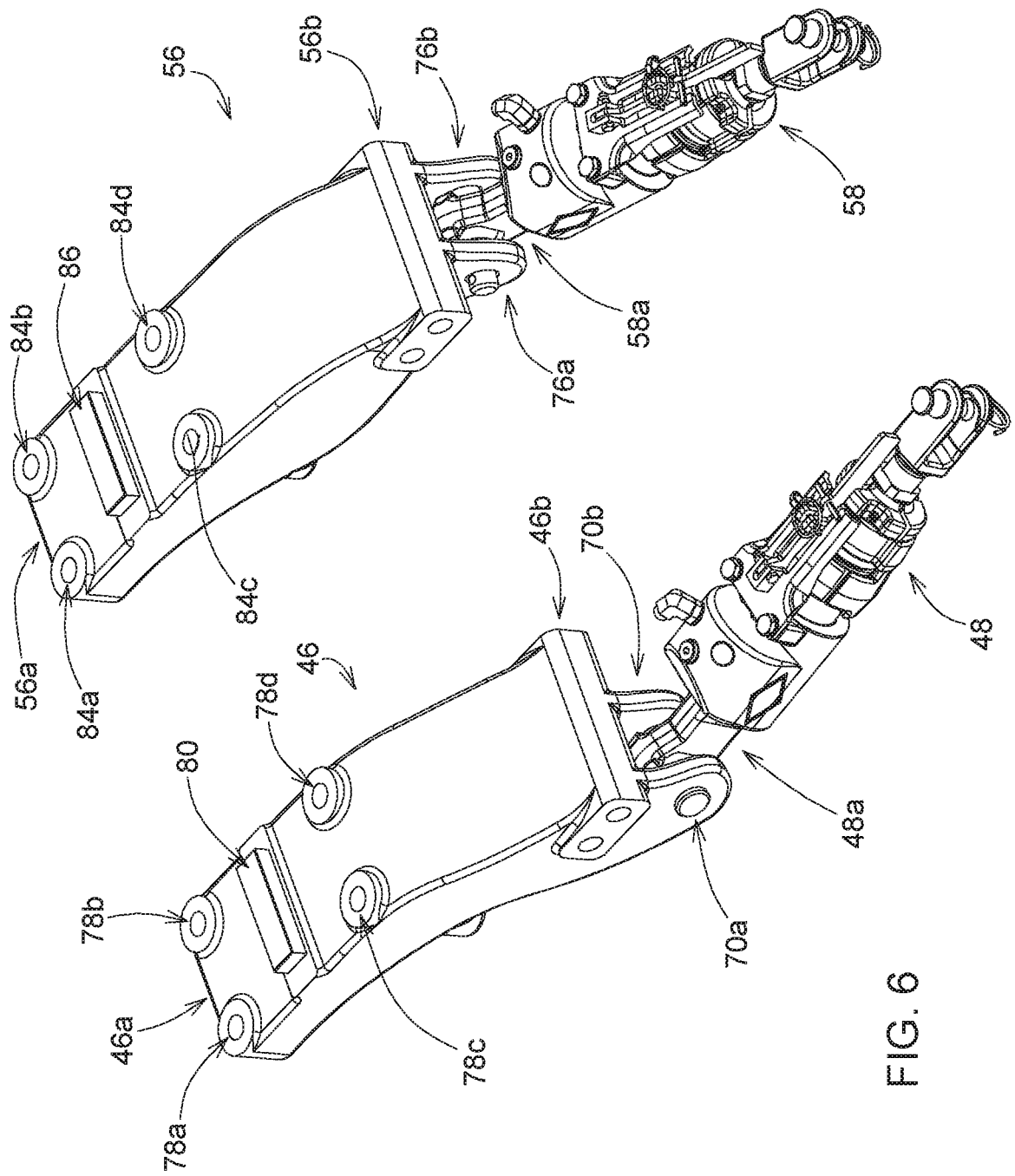
FIG. 6 is a perspective view of a portion of the work vehicle.

FIG. 6 illustrates the first bracket 46 and the second bracket 56 in greater detail. The first portion 46a of the first bracket 46 defines four apertures 78a, 78b, 78c, 78d and a first protrusion 80. The apertures 78a, 78b, 78c, 78d are each sized to receive a respect one of the fasteners 68a, 68b, 68c, 68d. The first protrusion 80 is sized to extend into the first slot 66 of the chassis 24. The first protrusion 80 and the first slot 66 engage to inhibit rotation of the first bracket 46 with respect to the chassis and also help to retain the first bracket 46 in a proper location and orientation while the fasteners 68a, 68b, 68c, 68d are installed.

The inter-engagement of the 68a, 68b, 68c, 68d fasteners in the respective apertures 78a, 78b, 78c, 78d and the first protrusion 80 in the first slot 66 inhibits the first bracket 46 from rotating or translating with respect to the chassis 24. Other inter-engaging configurations can be utilized in addition to or in place of the first slot 66 and the first protrusion 80. In some embodiments, the chassis 24 includes a protrusion and the first bracket 46 includes a recess sized to receive the protrusion of the chassis 24. The second portion 46b of the first bracket 46 includes the downwardly depending flanges 70a, 70b that receive the first portion 48a of the first stabilizer bar 48 therebetween.

The first portion 56a of the second bracket 56 defines four apertures 84a, 84b, 84c, 84d and a second protrusion 86. The apertures 84a, 84b, 84c, 84d are each sized to receive a respect one of the fasteners 74a, 74b, 74c, 74d. The second protrusion 86 is sized to extend into the second slot 72 of the chassis 24. The second protrusion 86 and the second slot 72 engage to inhibit rotation of the second bracket 56 with respect to the chassis and also help to retain the second bracket 56 in a proper location and orientation while the fasteners 74a, 74b, 74c, 74d are installed.

The inter-engagement of the 74a, 74b, 74c, 74d fasteners in the respective apertures 84a, 84b, 84c, 84d and the second protrusion 86 in the second slot 72 inhibits the second bracket 56 from rotating or translating with respect to the chassis 24. Other inter-engaging configurations can be utilized in addition to or in place of the second slot 72 and the second protrusion 86. In some embodiments, the chassis 24 includes a protrusion and the second bracket 56 includes a recess sized to receive the protrusion of the chassis 24. The second portion 56b of the second bracket 56 includes the downwardly depending flanges 76a, 76b that receive the first portion 58a of the second stabilizer bar 58 therebetween.

The first bracket 46 is directly connected to the chassis 24 via the fasteners 68a, 68b, 68c, 68d and the mating connection between the first slot 66 and first protrusion 80. The second bracket 56 is directly connected to the chassis 24 via the fasteners 74a, 74b, 74c, 74d and the mating connection between the second slot 72 and the second protrusion 86. The first bracket 46 is not directly connected to the second bracket 56. Rather, the first bracket 46 is only connected to the second bracket 56 indirectly through the chassis 24.

The first portion 46a of the first bracket 46 is spaced a first distance from the first portion 56a of the second bracket 56. The second portion 46b of the first bracket 46 is spaced a second distance from the second portion 56b of the second bracket 56. The first distance and the second distance remain substantially constant during operation as the first bracket 46 is fixed to the chassis 24 and the second bracket 56 is fixed to the chassis 24.

What is claimed is:

1. A work vehicle comprising:
a ground-engaging implement;
a chassis supported on the ground-engaging implement;
a prime mover configured to move the chassis along a ground surface;
a hitch connected to the chassis and configured to rotate with respect to the chassis, the hitch having
  a first bracket connected to a first portion of the chassis,
  a first stabilizer bar connected to the first bracket,
  a first hitch arm connected to the first stabilizer bar, the first hitch arm configured to selectively engage a work implement,
  a second bracket connected to a second portion of the chassis, the second portion of the chassis being spaced from the first portion of the chassis, such that the second bracket is spaced apart from and independent of the first bracket,
  a second stabilizer bar connected to the second bracket, and
  a second hitch arm connected to the first stabilizer bar, the second hitch having a free end configured to selectively engage the work implement,
a controller in electrical communication with the first stabilizer bar, with the second stabilizer bar, and with the work implement; and
a user interface engageable by a user and in electrical communication with the controller,
wherein the chassis includes one of a mating recess and a mating protrusion and the first bracket includes the other of the mating recess and the mating protrusion, wherein the mating recess is configured to receive the mating protrusion while the first bracket is connected to the chassis to thereby inhibit rotation of the first bracket with respect to the chassis.

2. The work vehicle of claim 1, wherein the first stabilizer bar is configured to move the first hitch arm with respect to the first bracket and the second stabilizer bar is configured to move the second hitch arm with respect to the second bracket.

3. The work vehicle of claim 1, wherein the first bracket includes a first end portion and a second end portion spaced from the first end portion, the first end portion being connected to the chassis and the second end portion being connected to the first stabilizer bar.

4. The work vehicle of claim 3, wherein the second bracket includes a first end portion and a second end portion spaced from the first end portion, the first end portion being connected to the chassis and the second end portion being connected to the second stabilizer bar.

5. The work vehicle of claim 4, wherein the first end portion of the first bracket is spaced a first distance from the first end portion of the second bracket and wherein the second end portion of the second bracket is spaced a second distance from the second end portion of the second bracket.

6. The work vehicle of claim 1, wherein the chassis includes a first side portion and a second side portion, opposite the first side portion, wherein the first bracket is connected to the first side portion of the chassis and the second bracket is connected to the second side portion of the chassis.

7. The work vehicle of claim 1, wherein the chassis includes the mating recess and the first bracket includes the mating protrusion, wherein the mating protrusion extends into the chassis, such that the protrusion is configured to be contained within the mating recess while the first bracket is connected to the chassis.

8. The work vehicle of claim 1, further comprising a fastener extending through a portion of the chassis and through a portion of the first bracket to connect the first bracket to the chassis.

9. The work vehicle of claim 1, further comprising a plurality of fasteners, each of the plurality of fasteners extending through a portion of the chassis and through a portion of the first bracket to connect the first bracket to the chassis.

10. The work vehicle of claim 1, wherein the mating recess is defined by the chassis, and the mating recess is a first recess, the chassis further defining a second recess, the chassis having a chassis thickness proximate the first recess,
  wherein the protrusion is a first protrusion defining a first protrusion height, the first protrusion height being shorter than the chassis thickness, and
  wherein the second bracket includes a second protrusion configured to extend into the second recess while the second bracket is connected to the chassis.

11. The work vehicle of claim 1, wherein the first bracket is connected to the second bracket only indirectly through the chassis.

12. A hitch for a work vehicle, the hitch configured to connected to a chassis of the work vehicle and configured to rotate with respect to the chassis, the chassis defines one of a protrusion and a recess, the hitch comprising:
   a first bracket defining the other of the protrusion and the recess, the first bracket configured to be connected to a first portion of the chassis via the protrusion and the recess, such that rotation of the first bracket with respect to the first portion of the chassis is inhibited while the protrusion extends into the recess;
   a first stabilizer bar connected to the first bracket;
   a first hitch arm connected to the first stabilizer bar, the first hitch arm having a free end configured to selectively engage a work implement;
   a second bracket configured to be connected to a second portion of the chassis, the second portion of the chassis being spaced from the first portion of the chassis, such that the second bracket is spaced apart from and independent of the first bracket;
   a second stabilizer bar connected to the second bracket; and
   a second hitch arm connected to the first stabilizer bar, the second hitch having a free end configured to selectively engage the work implement.

13. The hitch of claim 12, wherein the first stabilizer bar is configured to move the first hitch arm with respect to the first bracket and the second stabilizer bar is configured to move the second hitch arm with respect to the second bracket.

14. The hitch of claim 12, wherein the first bracket includes a first end portion and a second end portion spaced from the first end portion, the first end portion configured to be connected to the chassis and the second end portion being connected to the first stabilizer bar.

15. The hitch of claim 14, wherein the second bracket includes a first end portion and a second end portion spaced from the first end portion, the first end portion configured to be connected to the chassis and the second end portion being connected to the second stabilizer bar.

16. The hitch of claim 12, wherein the first bracket includes the mating protrusion and the chassis is configured to include the mating recess, wherein the portion of the chassis defining the mating recess has a chassis thickness, and the mating protrusion has a protrusion height extending from an outer surface of the first bracket, wherein the protrusion height is shorter than the chassis thickness.

17. The hitch of claim 12, further comprising a fastener extending through a portion of the first bracket and configured to extend through a portion of the chassis, such that the fastener is configured to connect the first bracket to the chassis.

18. The hitch of claim 16, wherein the mating recess is a first recess, the chassis further defines a second recess,
   wherein the protrusion is a first protrusion and is configured to be contained within the first recess while the first bracket is connected to the chassis, and
   wherein the second bracket includes a second protrusion configured to extend into the second recess while the second bracket is connected to the chassis.

19. The hitch of claim 12, wherein the first bracket is connected to the second bracket only indirectly through the chassis.

20. A work vehicle comprising:
   a ground-engaging implement;
   a chassis supported on the ground-engaging implement, the chassis including a first side portion and a second side portion, opposite the first side portion;
   a prime mover configured to move the chassis along a ground surface on the ground-engaging implement;
   a hitch connected to the chassis and configured to rotate with respect to the chassis, the hitch having
      a first bracket including a first end portion and a second end portion spaced from the first end portion, the first end portion being connected to the first side portion of the chassis,
      a first stabilizer bar connected to the second end portion of the first bracket,
      a first hitch arm connected to the first stabilizer bar, the first hitch arm having a free end configured to selectively engage a work implement,
      a first lift arm connected to the chassis and connected to the first hitch arm, the first hitch arm being moveable with respect to the first bracket by the first lift arm,
      a second bracket including a first end portion and a second end portion spaced from the first end portion, the first end portion being connected to the second side portion of the chassis, the second portion of the chassis being spaced from the first portion of the chassis, such that the first end portion of the first bracket is spaced from the first end portion of the second bracket, and the second end portion of the second bracket is spaced from the second end portion of the second bracket, the first bracket being connected to the second bracket only indirectly through the chassis,
      a second stabilizer bar connected to the second end portion of the second bracket, and
      a second hitch arm connected to the first stabilizer bar, the second hitch having a free end configured to selectively engage the work implement,
      a second lift arm connected to the chassis and connected to the second hitch arm, the second hitch arm being moveable with respect to the second bracket by the second lift arm,
   a plurality of fasteners, each of the plurality of fasteners extending through a portion of the chassis and through a portion of the first bracket to connect the first bracket to the chassis;
   wherein the chassis includes one of a first mating recess and a first mating protrusion and the first bracket includes the other of the first mating recess and the first mating protrusion, wherein the first mating protrusion is configured to be contained within the first mating recess while the first bracket is connected to the chassis to thereby inhibit rotation of the first bracket with respect to the chassis, and
   wherein the chassis includes one of a second mating recess and a second mating protrusion and the second bracket includes the other of the second mating recess and the second mating protrusion, wherein the second mating protrusion is configured to be contained within the second mating recess while the second bracket is connected to the chassis to thereby inhibit rotation of the second bracket with respect to the chassis.

* * * * *